Feb. 5, 1935. F. K. FILDES 1,989,920
CONTAINER CARRYING VEHICLE
Filed March 15, 1933  3 Sheets-Sheet 3
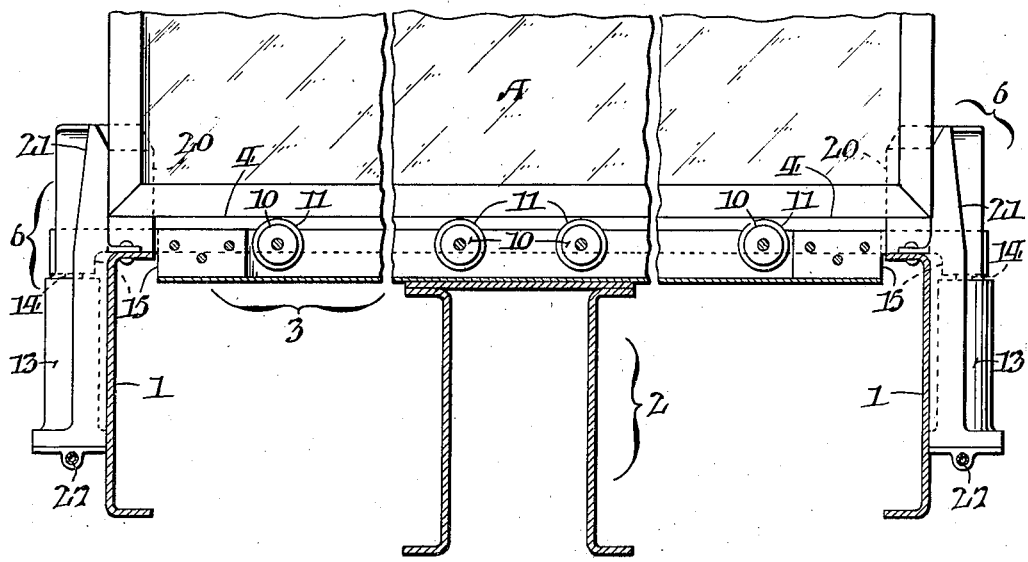
FIG. III.
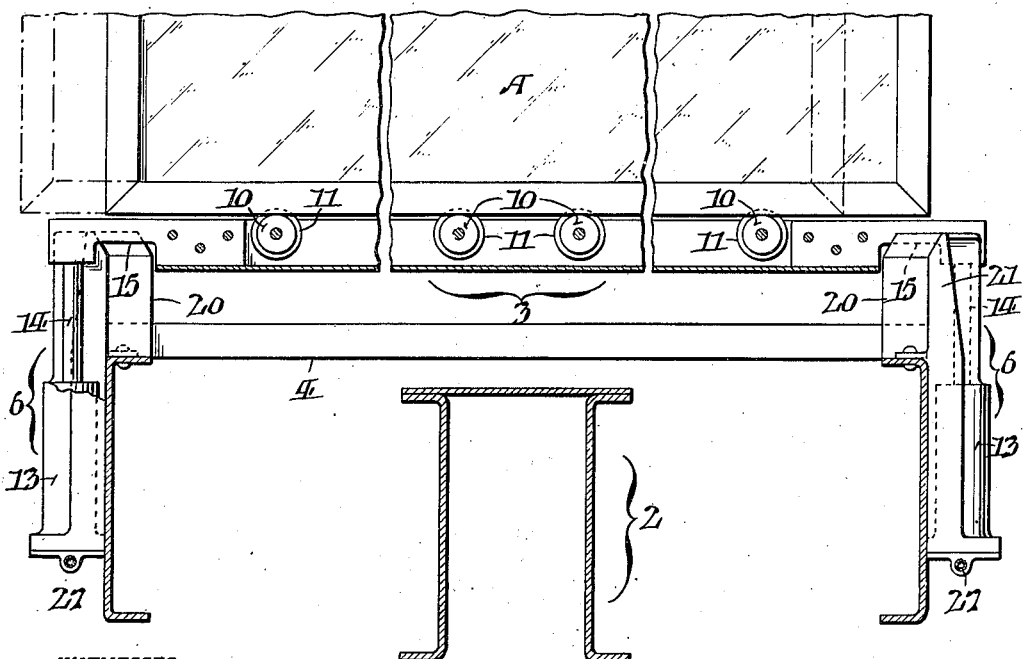
FIG. IV.
WITNESSES:
Thomas W. Kerr Jr.
William Bell, Jr.
INVENTOR:
Frederick K. Fildes,
BY Talley & Paul
ATTORNEYS.

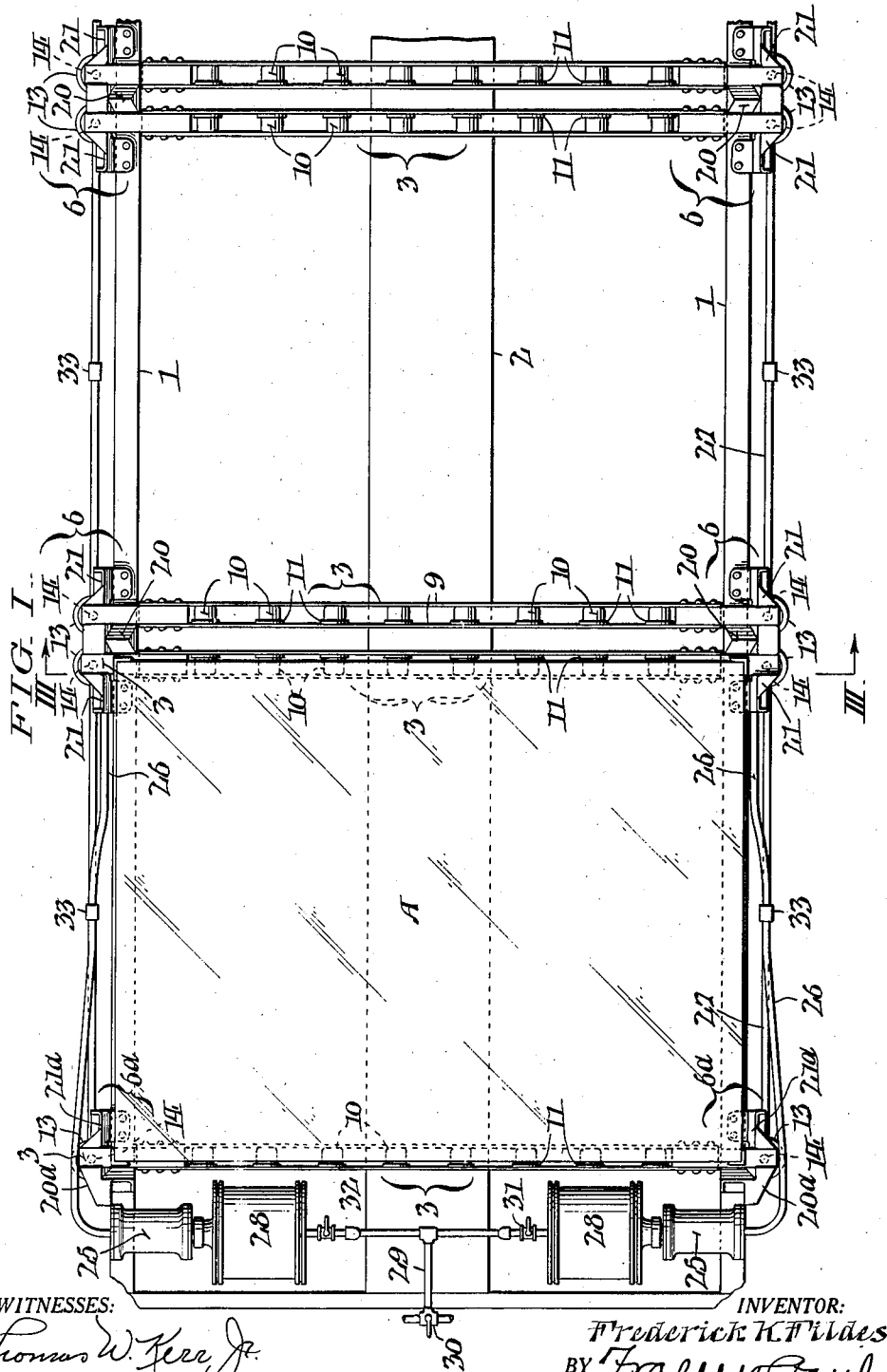

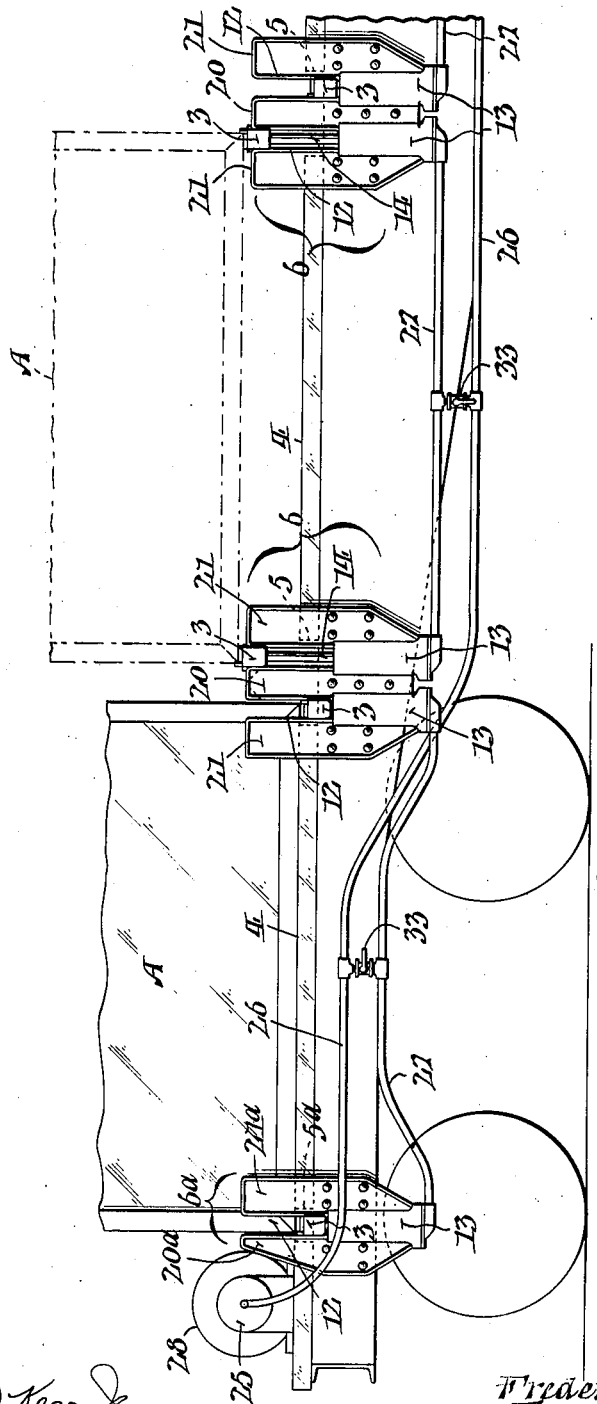

Patented Feb. 5, 1935

1,989,920

UNITED STATES PATENT OFFICE 1,989,920

CONTAINER CARRYING VEHICLE

Frederick K. Fildes, Altoona, Pa.

Application March 15, 1933, Serial No. 660,820

9 Claims. (Cl. 105—366)

This invention relates to container carrying vehicles, and more particularly to apparatus for loading and unloading containers from such vehicles.

In my pending application for U. S. Letters Patent, Serial No. 660,821, filed March 15, 1933, I referred to certain problems and difficulties involved in loading and unloading containers on railway vehicles at locations where cranes are not available, and I have there shown manually operated car apparatus for facilitating the loading and unloading operations at such locations.

The object of my present invention is to provide in a container carrying vehicle, such as a railway flat car, means for facilitating the loading and unloading of containers, which means are actuated through a source of power available on the vehicle, such as the train brake pipe.

Further and more specific objects of my invention, including the provision of special forms of container seating abutments, will be apparent from the detailed description of one embodiment thereof, which is hereinafter set forth, having reference to the accompanying drawings. Of the drawings:

Fig. I represents a plan view of one end of a railway container carrying vehicle of my invention with one container seated thereon.

Fig. II represents a side elevation of the same, showing in addition a container represented in dotted lines which has been raised upon roller guides preparatory to loading or unloading.

Fig. III represents cross section of the container car, taken as indicated by the lines III—III of Fig. I; and, Fig. IV represents an additional cross section of the same, showing the container in raised position, ready for removal from the car platform.

With reference to the particular example of my invention shown in the drawings, Fig. I shows a plan view of a portion of a railway container carrying vehicle generally similar to an ordinary flat car. The side sills of the car are designated at 1, and the center sill, shown most clearly in Figs. I, III and IV, is designated at 2. Spaced longitudinally of the car, and extending transversely from side to side are vertically movable roller guides 3 which serve as means for facilitating the loading and unloading of the containers, there being a pair of roller guides for each container seating space of the car. Normally, the roller guides 3 are housed beneath the top surface of the car platform 4, in which positions they rest upon the top of the center sill 2, as shown clearly in Fig. III.

The nature of the car platform 4 is most clearly illustrated in Fig. II. While the car platform 4 may take a number of different forms, I preferably employ a construction which affords a continuous floor except for transversely extending openings 5, 5a at the regions between the container seating spaces. Thus when the containers, represented at A, are seated on the car, the platform 4 presents relatively large floor surfaces to the bottoms of the containers, and the frictional resistance to shifting of the containers is correspondingly large, relieving the container seating abutments of undue stress. The container seating abutments 6, 6a define corners of rectangular seats and determine the positions occupied by the containers when mounted on the car.

The roller guides 3 are made up of metal roller frames 9, two to each roller guide, and rollers 10 mounted between the members of a pair. The rollers 10 have flanges 11 for guiding the bottom edges of the containers in their movement onto or off the car. At each end of the car there is a single roller guide 3 movable vertically in the platform opening 5a, whereas in the opening 5 at the intermediate regions of the car there are two adjacent roller guides 3 spaced from each other in parallel relation.

The roller guides 3 extend at each end beyond the side sills 1 of the car and are guided for vertical movement by means of guideways 12 in the container seating abutments 6, 6a. Movement in a vertical direction is imparted to the roller guides 3 by means of cylinders 13 and pistons 14, the latter engaging the extremities of the roller guides. The roller guides have recessed formations 15, which when the roller guides are in housed position, fit over the top flanges of the side sills 1. Preferably the elevating cylinders 13 for the roller guides 3 are formed integrally with the side abutments 6, 6a, thus making of the stationary attachments at the sides of the vehicle a rigid structure capable of withstanding rough usage. At the regions of the car intermediate the ends, the side abutments 6 are employed, these abutments including a central upstanding riged element 20 affording a stop for the end walls of two adjacent containers, and additional upstanding elements 21 affording stops for the side walls of adjacent containers. The guideways 12 for the roller guides 3 separate the elements 20 from the elements 21. The end abutments 6a of which there are two at each end of the car, are of similar formation except that each such abutment has only one guideway 12, one transversely disposed stop 20a, and one longitudinally disposed stop 21a.

The elevating cylinders 13 are actuated by means of a hydraulic medium, and the stroke of their pistons 14 is such as to permit the elevation of the roller guides 3 above the top edges of the abutments 6, 6a. The pneumatic-hydraulic system preferably employed for raising and lowering the containers includes in the illustrated example in addition to the elevating cylinders 13, two master hydraulic cylinders 25, each one actuating all of the elevating cylinders 13 which are disposed on the corresponding side of the car platform 4, and pipes 26, 27. The system also includes pneumatic actuating cylinders 28, one for each master hydraulic cylinder 25. The pneumatic actuating cylinders 28 are connected to the air brake line 29 of the car from which they derive power.

I employ hydraulic elevating cylinders 13 for elevating the roller guides 3, instead of pneumatic cylinders connected directly to the air brake line 29 in order to secure a less flexible mounting than would be possible with pneumatic elevating cylinders. With the use of hydraulic elevating cylinders 13, there is but little expansion of the liquid and therefore but little movement of the pistons when load is removed from the roller guides 3. Furthermore, this arrangement permits retaining the containers in a raised position after air may have leaked out of the brake system. The non-compressible characteristic of the liquid in the hydraulic elevating cylinders 13 has the further advantage that, when a container is rolled onto the elevated roller guides 3 from a station platform, there is avoided any possibility of the roller guides 3 settling down under the weight of the container. If this were to happen, a container would come to rest on the top edges of the combination end and side abutments 6, 6a effectually preventing further movement of the container on the roller guides 3 in either direction as long as his fouled condition continued.

As the pneumatic actuating cylinders 28, the hydraulic master cylinders 25 and the hydraulic elevating cylinders 13 are simple metal cylinders with the usual pistons and piston rods, detailed description of their construction, which is not material to my invention, is here omitted. It will be noted, however, that the piston rod of each master hydraulic cylinder 25 is also the piston rod of its corresponding pneumatic actuating cylinder 28, the piston of one being on one end of the common piston rod and the piston of the other being on the other end. Operation of the pneumatic actuating cylinders 28 is controlled by valves 30, 31, 32 by means of which both actuating cylinders 28 may be operated simultaneously or independently of each other.

From each master hydraulic cylinder 25 the main supply pipe line 26 runs the length of the vehicle. From this main supply line 26, the branch lines 27 lead to each elevating cylinder 13, the branch lines to the elevating cylinders 13 of each pair of roller guides 3, and at one side of the vehicle being connected to the main supply line through a common control valve 33.

The operation of the illustrated embodiment of my invention will be explained by describing the unloading of a container assumed to be seated on the carrying vehicle at the end of its journey, the vehicle being drawn alongside a station platform. Of course, a truck designed to receive the container could take the place of the usual station platform. If it be assumed that all of the valves are closed, and that it is desired to raise each container separately, the main supply lines 26 are energized by opening the valves 30, 31, 32, which admits pressure to the pneumatic actuating cylinders 28 and in turn admits pressure to the master hydraulic cylinders 25. Subsequently the valves 33 controlling the particular branch pipes 27 serving the elevating cylinders of the container to be raised are opened, and the container is caused to be raised above the level of the top edges of its seating abutments. By proper manipulation of the valves 33, the two roller guides 3, associated with a container, may be caused to be raised evenly, thus preventing the container from jamming against its seating abutments. The valves 33 are closed when the container has been raised, and due to the hydraulic support this position will be sustained regardless of pressure losses in the pneumatic-hydraulic system.

On the other hand, if it be desired to raise all of the containers of the carrying vehicle simultaneously, this can obviously be accomplished by opening all of the control valves 33, as well as the control valves 31, 32 and finally opening the control valve 30 in the air brake line 29. Following this procedure the elevating cylinders 13 on both sides of the car will be raised simultaneously. In an obvious manner the system selected is characterized by considerable flexibility of operation.

From the above description it will be apparent that the apparatus of this invention lends itself to a simple and rugged construction, and that it can be manipulated handily by a single person. It is easily incorporated into an ordinary flat car and fulfills the need of an unloading apparatus which goes with the car, thereby avoiding dependence upon cranes, lift trucks or like apparatus at the loading and unloading stations. While the car is transporting containers, the roller guides are relieved of the load and the containers are seated in the usual fashion, resting on the vehicle platform. Moreover, the car may obviously be used for many other purposes than for the transportation of containers.

While my invention has been described in some detail with reference to a preferred embodiment thereof, various changes in the form of the apparatus are within the contemplation of the invention, and such changes should not be deemed to constitute a departure from the spirit thereof as hereinafter claimed.

Having thus described my invention, I claim:

1. In combination with a container carrying vehicle having a frame and a platform thereon, roller guides extending transversely of said platform and abutments rigidly attached to said frame at the ends of said roller guides and defining a seat for a container, said roller guides comprising a rigid frame with rollers mounted thereon, and being attached to the first mentioned frame with capacity for vertical movement from a housed position beneath the top of said platform to a position above the tops of said abutments.

2. In combination with a container carrying vehicle having a frame and a platform thereon, roller guides extending transversely of said platform, and abutments rigidly attached to said frame at the ends of said roller guides, said abutments defining a rectangular seat for a container and affording vertical guideways for the ends of said roller guides, and means for raising said roller guides in said guideways from a housed position to a position above the top of said abutments.

3. In combination with a container carrying vehicle having a frame and a platform thereon, roller guides extending transversely of said platform, and abutments rigidly attached to said frame at the ends of said roller guides, said abutments defining a rectangular seat for a container and affording vertical guideways for the ends of said roller guides, and cylinders mounted on said frame outside said abutments for raising said roller guides in said guideways from a housed position to a position above the top of said abutments.

4. In combination with a container carrying vehicle having a frame and a platform thereon, said platform having transversely extending openings spaced longitudinally of said platform to coincide with the edges of containers arranged on said platform according to a predetermined seating plan, transversely extending roller guides supported on said frame, and having capacity for vertical movement from completely housed positions in said openings, said roller guides comprising a rigid frame with rollers mounted thereon, hydraulic elevating cylinders supported on said first named frame, the pistons of said cylinders being connected to said roller guides and adapted to raise said guides above the level of said platform for loading and unloading containers, and a master cylinder for supplying hydraulic pressure to said elevating cylinders.

5. In combination with a container carrying vehicle having a frame and a platform thereon, said platform having transversely extending openings spaced longitudinally thereof to coincide with the edges of containers arranged on said platform according to a predetermined seating plan, transversely extending roller guides supported by said frame and having capacity for vertical movement from completely housed positions in said openings, said roller guides being disposed in pairs with a pair for each container, container seating abutments fastened to said frame at the sides of said platform opposite the ends of adjacent guides of adjacent pairs, and hydraulic elevating cylinders supported by said frame, the pistons of said cylinders being connected to said roller guides and adapted to raise said guides above the level of the top edges of the container seating abutments incident to loading and unloading.

6. In combination with a container carrying vehicle having a frame and a platform thereon, said platform having transversely extending openings spaced longitudinally to coincide with the edges of containers arranged on said platform according to a predetermined seating plan, transversely extending roller guides supported by said frame and having capacity for vertical movement from completely housed positions beneath the vehicle platform in said openings, combination end and side abutments fastened to said frame at the sides of said platform and opposite the ends of adjacent roller guides of adjacent pairs, hydraulic elevating cylinders disposed one at each end of a roller guide with pistons connected thereto for raising said roller guides above the top edges of the side element of said combination abutments, a master cylinder for actuating said elevating cylinders, and a pipe system connecting each said elevating cylinder with said master cylinder, said system comprising a main supply line, and branch lines to each elevating cylinder, the branch lines to the elevating cylinders of each pair of roller guides and at one side of the vehicle being connected to said main supply line by a common control valve.

7. In combination with a railroad container carrying vehicle having a frame and a platform, said platform having transversely extending openings spaced longitudinally thereof according to a predetermined seating plan, transversely extending roller guides supported by said frame and having capacity for vertical movement from housed positions beneath the vehicle platform in said openings, said roller guides being in pairs, container seating abutments fastened to said frame at the sides of said platform opposite adjacent roller guides of adjacent pairs, hydraulic elevating cylinders disposed one at each end of each said roller guides with pistons connected thereto for raising said roller guides above the top edges of said abutments, a master cylinder for actuating said elevating cylinders, a pipe system connecting each said elevating cylinder with said master cylinder, and a pneumatic actuating cylinder with piston connected to the piston of said master hydraulic cylinder, said pneumatic cylinder receiving its pressure medium from the brake system of the car.

8. In combination with a container carrying vehicle having a frame and a platform thereon, roller guides extending transversely of said platform, abutments rigidly attached to said frame at the ends of said roller guides, said abutments defining a seat for a container, and elevating cylinders formed integrally with said abutments and adapted to raise said roller guides from a housed position near the level of said platform to a position above the top of said abutments.

9. In combination with a container carrying vehicle having a frame and a platform thereon, roller guides extending transversely of said platform, abutments rigidly attached to said frame at the ends of said roller guides, said abutments defining a seat for a container and affording vertical guideways for the ends of said roller guides, and elevating cylinders formed integrally with said abutments at the outside thereof and adapted to raise said roller guides from a housed position near the level of said platform to a position above the top of said abutments.

FREDERICK K. FILDES.